(12) United States Patent
Asoma

(10) Patent No.: US 6,434,104 B2
(45) Date of Patent: Aug. 13, 2002

(54) OBJECTIVE LENS, OPTICAL PICKUP DEVICE AND OPTICAL DISK DEVICE

(75) Inventor: Yoshito Asoma, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/788,519

(22) Filed: Feb. 21, 2001

(30) Foreign Application Priority Data

Feb. 23, 2000 (JP) ........................................ 2000-052197

(51) Int. Cl.$^7$ ................................................. G11B 7/00
(52) U.S. Cl. .............................. 369/112.08; 369/44.23; 369/112.23; 369/112.1
(58) Field of Search .......................... 369/44.11, 44.12, 369/44.23, 44.25, 44.28, 103, 112.01, 112.02, 112.08, 112.1, 112.13, 112.15, 112.2, 112.23, 112.26

(56) References Cited

U.S. PATENT DOCUMENTS 5,153,873 A * 10/1992 Spruit et al. ........ 369/109.01 X
5,161,040 A * 11/1992 Yokoyama et al. .. 369/44.14 X
5,161,063 A * 11/1992 Krill et al. .......... 369/112.23 X

* cited by examiner

Primary Examiner—Muhammad Edun
(74) Attorney, Agent, or Firm—Rader, Fishman & Grauer PLLC; Ronald P. Kananen, Esq.

(57) ABSTRACT

An objective lens comprises a single objective lens adapted to a finite system having first and second aspherical surfaces and a hologram is formed on at least one of said aspherical surfaces. The light of the positive 1st order or that of the negative 1st order of the hologram is subjected to optimal correction of spherical aberration under actual operating conditions. When a semiconductor laser is used as light source, the change in the spherical aberration caused by the change in the refractive index arising as a result of the change in the environmental temperature of the medium between the first surface and the second surface is substantially offset by the change in the spherical aberration of the hologram attributable to the change in the oscillation wavelength of the semiconductor laser of the light source caused by the change in the environmental temperature so that, if the objective lens has a numerical aperture greater than 0.5, the astigmatism is favorably corrected regardless of the change in the environment particularly in terms of temperature. Such an objective lens can make it easy to downsize an optical pickup device comprising it.

24 Claims, 4 Drawing Sheets

OBJECTIVE LENS, OPTICAL PICKUP DEVICE AND OPTICAL DISK DEVICE

BACKGROUND OF THE INVENTION

1. Field of the Invention

This invention relates to an objective lens, to an optical pickup device comprising such an objective lens and also to an optical disk device comprising such an optical pickup device.

2. Related Background Art

A number of different types of optical recording medium such as optical disks have been proposed along with optical pickup devices adapted to write information signals to and read information signals from such an optical recording medium. There have also been proposed a number of different optical disk devices comprising an optical pickup device and adapted to record information signals to and reproduce information signals from an optical disk that is used as optical recording medium.

An optical pickup device is provided with a semiconductor laser operating as light source. The flux of light emitted from the semiconductor laser is converged onto the signal recording surface of the optical recording medium by means of an objective lens. Then, the optical pickup device detects the flux of light reflected by the signal recording surface of the optical recording medium by means of its optical detector.

Therefore, the optical pickup device can read any of the information signals recorded on the optical recording medium on the basis of the output of the optical detector and write information signals on the optical recording medium by irradiating the optical recording medium with a flux of light.

Meanwhile, efforts have been paid to reduce the diameter of the light spot formed on the optical recording medium as a result of the convergence of the flux of light irradiating the optical recording medium by increasing the numerical aperture (NA) of the objective lens in order to raise the density of recording information signals on the optical recording medium.

However, as the numerical aperture of the objective lens is increased, the power of the lens is also increased to make it difficult to design the imaging optical system of the optical pickup device so as to favorably correct the aberration of the optical system and maintain the corrected spherical aberration in the environment that is changing incessantly particularly in terms of temperature.

Thus, it has been highly difficult to achieve a numerical aperture greater than 0.5 in the case of the objective lens of a finite system. The term of "the objective lens of a finite system" as used herein refers to an objective lens adapted to receive a divergent flux of light emitted from a spot light source separated from it by a finite distance and converge the flux of light onto the signal recording surface of an optical recording medium.

In the case of the objective lens of an infinite system where the objective lens is adapted to receive a parallel flux of light and converge it onto the signal recording surface of an optical recording medium, there have been known those having a numerical aperture greater than 0.5. However, when using the objective lens of an infinite system, it is difficult to downsize the optical pickup device because a collimator lens has to be arranged between the objective lens and the light source in order to transform the divergent flux of light emitted from the light source into a parallel flux of light.

BRIEF SUMMARY OF THE INVENTION

In view of the above identified circumstances, it is therefore an object of the present invention to provide an objective lens having a numerical aperture greater than 0.5 while maintaining the favorably corrected spherical aberration in any environment that is changing incessantly particularly in terms of temperature and adapted to downsizing the optical pickup device comprising it. Another object of the present invention is to provide an optical pickup device comprising such an objective lens and an optical disk device comprising such an optical pickup device.

According to the invention, the above objects are achieved by providing an objective lens having a numerical aperture greater than 0.5 and comprising a single objective lens adapted to a finite system, said objective lens having first and second aspherical surfaces;

a hologram being formed on at least one of said aspherical surfaces, the light of the positive 1st order or that of the negative 1st order of the hologram being subjected to optimal correction of spherical aberration under actual operating conditions;

when using a semiconductor laser as light source, the change in the spherical aberration caused by the change in the refractive index arising as a result of the change in the environmental temperature of the medium between the first surface and the second surface being substantially offset by the change in the spherical aberration of the hologram attributable to the change in the oscillation wavelength of the semiconductor laser of the light source caused by the change in the environmental temperature.

In another aspect of the invention, there is provided an optical pickup device comprising:

a semiconductor laser operating as light source;

an objective lens for converging the flux of light emitted from the semiconductor laser onto the signal recording surface of an optical recording medium; and a photodetector for detecting the flux of light converged onto the signal recording surface by the objective lens and reflected from said signal recording surface;

said objective lens having a numerical aperture greater than 0.5 and comprising a single objective lens adapted to a finite system, said objective lens having first and second aspherical surfaces;

a hologram being formed on at least one of said aspherical surfaces, the light of the positive 1st order or that of the negative 1st order of the hologram being subjected to optimal correction of spherical aberration under actual operating conditions;

when using a semiconductor laser as light source, the change in the spherical aberration caused by the change in the refractive index arising as a result of the change in the environmental temperature of the medium between the first surface and the second surface being substantially offset by the change in the spherical aberration of the hologram attributable to the change in the oscillation wavelength of the semiconductor laser of the light source caused by the change in the environmental temperature.

In a further aspect of the invention, there is provided an optical disk device comprising:

a rotary drive mechanism for holding an optical disk and driving it to rotate; and an optical pickup device for recording information signals on or reproducing information signals from the optical disk driven to rotate by said rotary drive mechanism;

said optical pickup device including:
  a semiconductor laser operating as light source;
  an objective lens for converging the flux of light emitted from the semiconductor laser onto the signal recording surface of an optical recording medium; and
  a photodetector for detecting the flux of light converged onto the signal recording surface by the objective lens and reflected from said signal recording surface;
  said objective lens having a numerical aperture greater than 0.5 and comprising a single objective lens adapted to a finite system, said objective lens having first and second aspherical surfaces;
  a hologram being formed on at least one of said aspherical surfaces, the light of the positive 1st order or that of the negative 1st order of the hologram being subjected to optimal correction of spherical aberration under actual operating conditions;
  when using a semiconductor laser as light source, the change in the spherical aberration caused by the change in the refractive index arising as a result of the change in the environmental temperature of the medium between the first surface and the second surface being substantially offset by the change in the spherical aberration of the hologram attributable to the change in the oscillation wavelength of the semiconductor laser of the light source caused by the change in the environmental temperature.

As described above, an objective lens according to the invention comprises a single objective lens adapted to a finite system, said objective lens having first and second aspherical surfaces, a hologram being formed on at least one of said aspherical surfaces, the light of the positive 1st order or that of the negative 1st order of the hologram being subjected to optimal correction of spherical aberration under actual operating conditions;

When using a semiconductor laser as light source, the change in the spherical aberration caused by the change in the refractive index arising as a result of the change in the environmental temperature of the medium between the first surface and the second surface is substantially offset by the change in the spherical aberration of the hologram attributable to the change in the oscillation wavelength of the semiconductor laser of the light source caused by the change in the environmental temperature.

Thus, the present invention provides an objective lens having a numerical aperture greater than 0.5 while maintaining the favorably corrected spherical aberration in any environment that is changing incessantly particularly in terms of temperature and adapted to downsizing the optical pickup device comprising it. According to the invention, there are also provided an optical pickup device comprising such an objective lens and an optical disk device comprising such an optical pickup device.

DETAILED DESCRIPTION OF THE INVENTION

Now, the present invention will be described by referring to the accompanying drawing that illustrate preferred embodiments of the invention.

Figure 1:
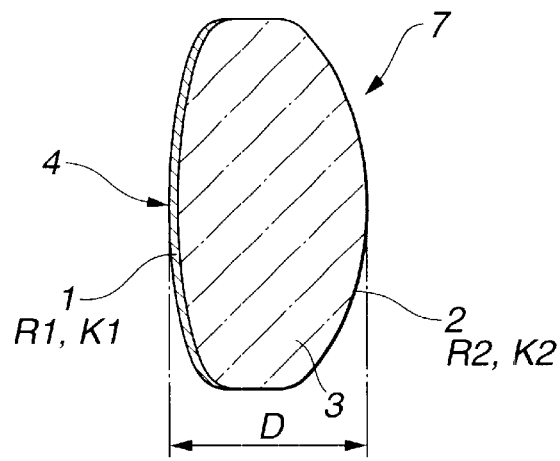
FIG. 1 is a schematic cross sectional view of an objective lens according to the invention, illustrating its configuration.

Referring to FIG. 1, an objective lens 7 according to the invention has a numerical aperture greater than 0.5 and comprises a single objective lens adapted to a finite system. Both the first surface 1 and the second surface 2 of the objective lens are aspherical. A transparent and uniform medium 3 typically made of a synthetic resin material is arranged between the first surface 1 and the second surface 2.

Then, a hologram (HOE) 4 is formed on at least either the first surface 1 or the second surface 2. The light of the positive 1st order or that of the negative 1st order of the hologram 4 is subjected to optimal correction of spherical aberration under actual operating conditions. In other words, when there is no hologram 4, neither the first surface 1 nor the second surface 2 are subjected to optimal correction of spherical aberration under actual operating conditions.

When a semiconductor laser is used as light source for emitting a flux of light that is transmitted through the objective lens 7, it is so arranged that the change in the spherical aberration caused by the change in the refractive index arising as a result of the change in the environmental temperature of the medium 4 between the first surface 1 and the second surface 2 is substantially offset by the change in the spherical aberration of the hologram 4 attributable to the change in the oscillation wavelength of the semiconductor laser of the light source caused by the change in the environmental temperature.

Referring to FIG. 1, if the radius of curvature of the first surface 1 and that of the second surface 2 of the objective lens 7 are respectively r1 and r2 and the focal length of the objective lens 7 is f, while the cone constants of the first and second surfaces of the objective lens are respectively k1 and k2 and the distance between the two surfaces is D, they satisfy the requirements of the formulas (1) through (5) listed below.

(1) $0.65 < r1/f < 0.75$
(2) $1.2 < r2/f < 1.4$
(3) $-0.85 < k1 < -0.7$
(4) $0.2 < k2 < 0.8$
(5) $0.8 < D/f < 1.2$

The change in the spherical aberration caused by the change in the refractive index arising as a result of the change in the environmental temperature of the medium 4 between the first surface 1 and the second surface 2 is substantially offset by the change in the spherical aberration of the hologram 4 attributable to the change in the oscillation wavelength of the semiconductor laser of the light source caused by the change in the environmental temperature when the requirements of the formulas (1) through (5) above are satisfied.

Figure 2:
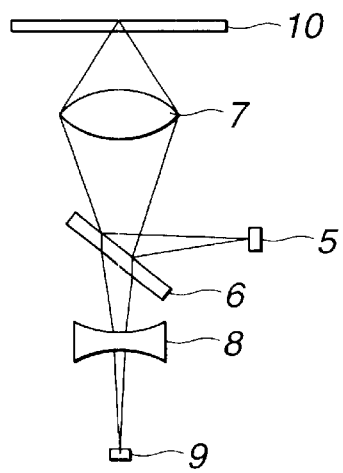
FIG. 2 is a schematic lateral view of an optical pickup device according to the invention and comprising an objective lens as illustrated in FIG. 1.

An optical pickup device according to the invention and comprising an objective lens according to the invention that has a configuration as described above is provided with a semiconductor laser 5 operating as light source as shown in FIG. 2. The divergent flux of light emitted from the semiconductor laser 5 is reflected by a beam splitter 6 before entering the objective lens 7. The beam splitter 6 is a plate having a pair of major planes that are parallel to each other and inclined by 45° relative to the optical axis of the flux of light emitted from the semiconductor laser 5 such that the optical path of the flux of light is deflected by 90° as the flux of light is reflected by the corresponding one of the surfaces of the beam splitter 6.

The flux of light that enters the objective lens 7 is then converged on the signal recording surface of optical disk 10 that operates as optical recording medium. The flux of light converged by the objective lens 7 is then reflected by the signal recording surface and once again enters the objective lens 7 as returning flux of light so that it is converged by the objective lens 7. The returning flux of light is then transmitted through the beam splitter 6 and received by photodetector 9 by way of detection lens 8.

Since the returning flux of light gives rise to astigmatism when transmitted through the beam splitter 6, it is possible to detect the focussing error signal indicating the distance between the focal point of the objective lens 7 and the signal recording surface of the optical disk 10 by detecting the direction and the extent of the astigmatism.

With the above optical pickup device, it is possible to read any of the information signals recorded on the optical disk 10 on the basis of the optical detection output of the photodetector 9 and write information signals on the optical disk 10 by irradiating the optical disk 10 with the flux of light emitted from the light source.

Figure 3:
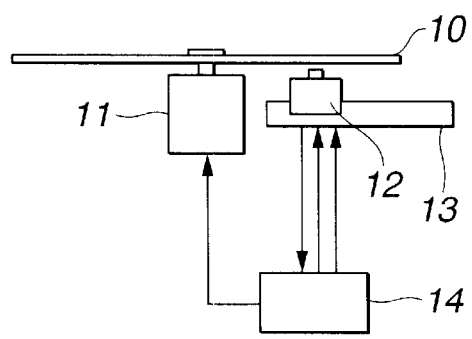
FIG. 3 is a schematic block diagram of an optical disk device according to the invention and comprising an optical pickup device as illustrated in FIG. 2.

Now, referring to FIG. 3, an optical disk device according to the invention and comprising an optical pickup device according to the invention and having the above described configuration is provided with a rotary drive mechanism 11 adapted to hold an optical disk 10 at the center thereof and drive it to rotate. In the optical disk device, the optical pickup device 12 is supported by a feed mechanism 13 in a state where the objective lens of the optical pickup device 12 is arranged vis-a-vis the signal recording surface of the optical disk 10 that is driven to rotate by the rotary drive mechanism 11. The optical disk 10 can be radially moved by the feed mechanism.

The output signal of the photodetector of the optical pickup device 12 is transmitted to and demodulated by signal processing device 14. Additionally, in the optical disk device, the semiconductor laser of the optical pickup device 12, the rotary drive mechanism 11 and the feed mechanism 13 are controlled by the signal processing device 14 such that information signals are recorded on and reproduced from the optical disk 10 by the optical disk device.

Now, the present invention will be described further by way of examples of objective lens 7.

In the following examples, a plastic material was used for the medium of the objective lens 7, which was designed so as to be used in an optical pickup device for so-called "DVDs (Digital Versatile Discs" (trademark). The refractive index n of the medium was 1.539397 when the wavelength λ of the incident flux of light was equal to the reference wavelength, or 655 nm.

EXAMPLE 1

An objective lens was prepared with a focal length f of 3.6 mm and a numerical aperture NA of 0.60.

As for the first surface, the values listed below were selected respectively for the radius of curvature R1, the cone constant k1, the aspheric factors A1, B1, C1 and D1.

R1=2.4613 mm
$k1=-7.98135\times10^{-1}$
$A1=-2.2088\times10^{-4}$
$B1=4.3924\times10^{-5}$
$C1=-5.3094\times10^{-6}$
$D1=-1.8085\times10^{-6}$ As for the second surface, the values listed below were selected respectively for the radius of curvature R2, the cone constant k2, the aspheric factors A2, B2, C2 and D2.

R2=-4.9441 mm
$k2=5.96593\times10^{-1}$
$A2=1.73154\times10^{-2}$
$B2=-2.86095\times10^{-3}$
$C2=3.20654\times10^{-4}$
$D2=-1.64321\times10^{-5}$ The distance between the two surfaces was defined as follows. D=3.2 mm The above values satisfy the requirements of the formulas (1) through (5).

Figure 4:
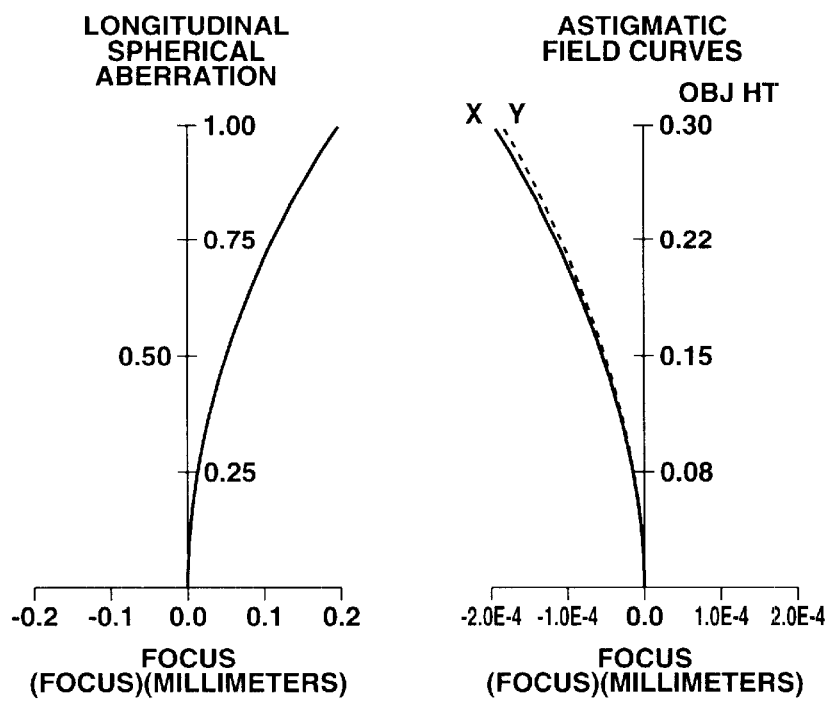
FIG. 4 shows graphs illustrating the spherical aberration and the astigmatism of light of the 0-th order of the hologram of Example 1 of the present invention.

FIG. 4 shows graphs illustrating the spherical aberration and the astigmatism of light of the 0-th order of the hologram 4 of Example 1 as aberration curves of the objective lens 7. In other words, the aberration curves represents the spherical aberration and the astigmatism of the objective lens 7 when no hologram 4 is provided. When no hologram 4 is provided, the first and second surfaces are not subjected to optimal correction of spherical aberration in actual operating conditions.

Figure 5:
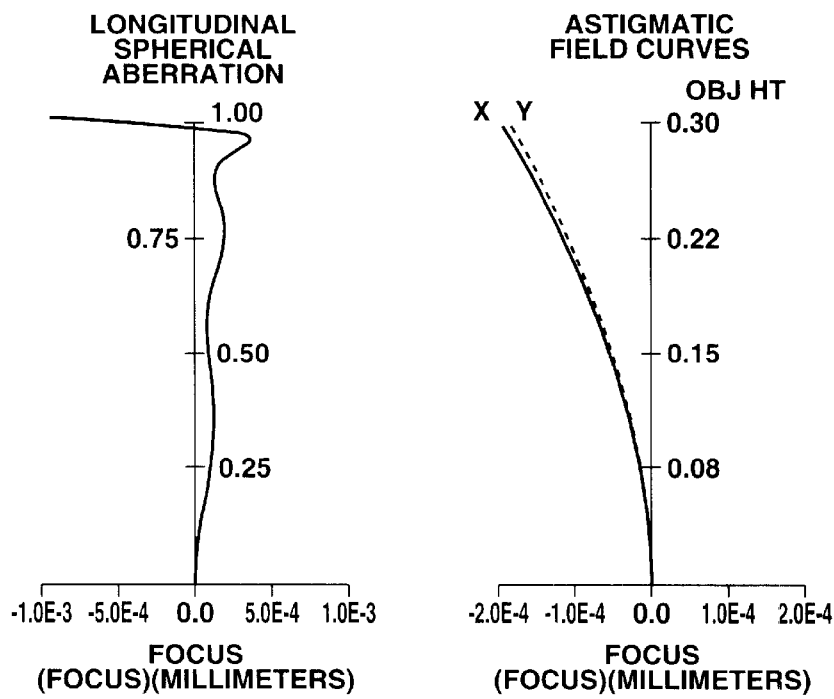
FIG. 5 shows graphs illustrating the spherical aberration and the astigmatism of light of the 1st order of the hologram of Example 1 of the present invention when the wavelength of the flux of incident light is equal to the reference wavelength.

FIG. 5 shows graphs illustrating the spherical aberration and the astigmatism of light of the 1st order of the hologram 4 of Example 1 when the wavelength of the flux of incident light is equal to the reference wavelength. In other words, the curves represents the spherical aberration and the astigmatism of the objective lens 7 in actual operating conditions. As shown in FIG. 5, the first and second surfaces are subjected to optimal correction of spherical aberration in actual operating conditions for the light of the positive 1st order (or the light of the negative 1st order) of the hologram 4.

Figure 6:
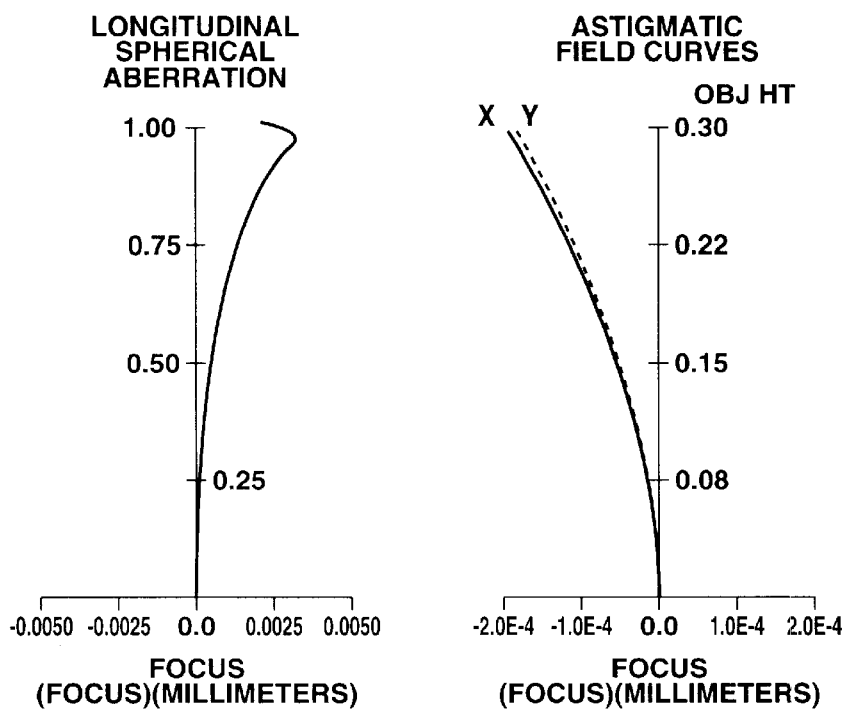
FIG. 6 shows graphs illustrating the spherical aberration and the astigmatism of light of the hologram of Example 1 of the present invention when the oscillation wavelength of the semiconductor laser is changed along with the refractive index of the medium by the change in the environmental temperature.

FIG. 6 shows graphs illustrating the spherical aberration and the astigmatism of light of the hologram of Example 1 when the oscillation wavelength of the semiconductor laser is changed by 8 nm along with the refractive index of the medium by the change in the environmental temperature. As shown in FIG. 6 when a semiconductor laser is used for the light source, the change in the spherical aberration caused by the change in the refractive index arising as a result of the change in the environmental temperature of the medium 4 between the first surface 1 and the second surface 2 is substantially offset by the change in the spherical aberration of the hologram 4 attributable to the change in the oscillation wavelength of the semiconductor laser of the light source caused by the change in the environmental temperature.

EXAMPLE 2

An objective lens was prepared with a focal length f of 3.2 mm and a numerical aperture NA of 0.60.

As for the first surface, the values listed below were selected respectively for the radius of curvature R1, the cone constant k1, the aspheric factors A1, B1, C1 and D1.

R1=2.2104 mm
k1=−7.3971×10$^{-1}$
A1=−2.0437×10$^{-3}$
B1=2.8339×10$^{-5}$
C1=2.0377×10$^{-5}$
D1=−9.3615×10$^{-6}$

As for the second surface, the values listed below were selected respectively for the radius of curvature R2, the cone constant k2, the aspheric factors A2, B2, C2 and D2.

R2=−4.1313 mm
k2=3.97415×10$^{-1}$
A2=2.77642×10$^{-2}$
B2=−6.05964×10$^{-3}$
C2=8.92911×10$^{-4}$
D2=−6.18937×10$^{-5}$

The distance between the two surfaces was defined as follows. D=3 mm

The above values satisfy the requirements of the formulas (1) through (5).

Figure 7:
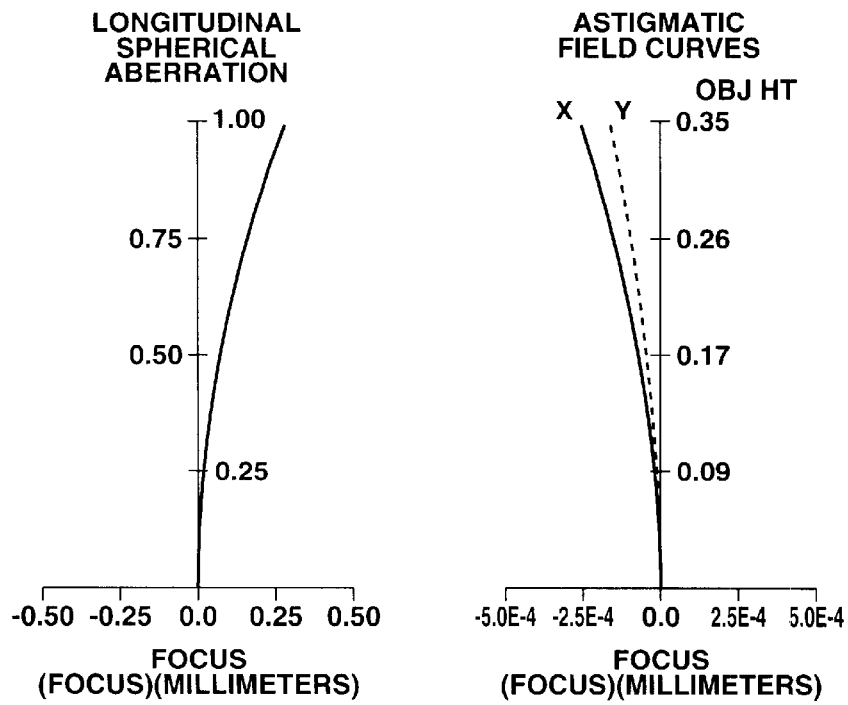
FIG. 7 shows graphs illustrating the spherical aberration and the astigmatism of light of the 0-th order of the hologram of Example 2 of the present invention.

FIG. 7 shows graphs illustrating the spherical aberration and the astigmatism of light of the 0-th order of the hologram 4 of Example 2 as aberration curves of the objective lens 7. In other words, the aberration curves represents the spherical aberration and the astigmatism of the objective lens 7 when no hologram 4 is provided. When no hologram 4 is provided, the first and second surfaces are not subjected to optimal correction of spherical aberration in actual operating conditions.

Figure 8:
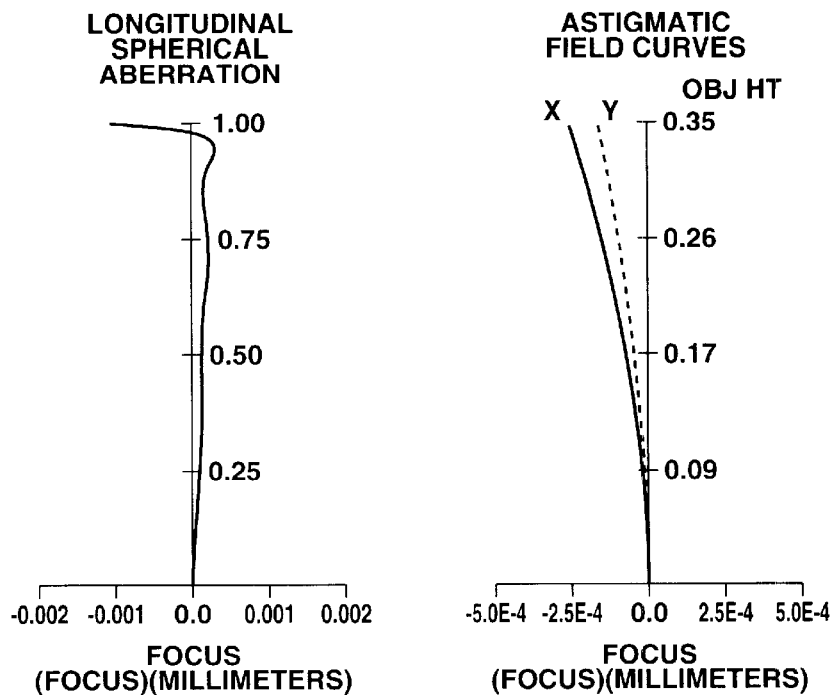
FIG. 8 shows graphs illustrating the spherical aberration and the astigmatism of light of the 1st order of the hologram of Example 2 of the present invention when the wavelength of the flux of incident light is equal to the reference wavelength.

FIG. 8 shows graphs illustrating the spherical aberration and the astigmatism of light of the 1st order of the hologram 4 of Example 2 when the wavelength of the flux of incident light is equal to the reference wavelength.

In other words, the curves represents the spherical aberration and the astigmatism of the objective lens 7 in actual operating conditions. As shown in FIG. 8, the first and second surfaces are subjected to optimal correction of spherical aberration in actual operating conditions for the light of the positive 1st order (or the light of the negative 1st order) of the hologram 4.

Figure 9:
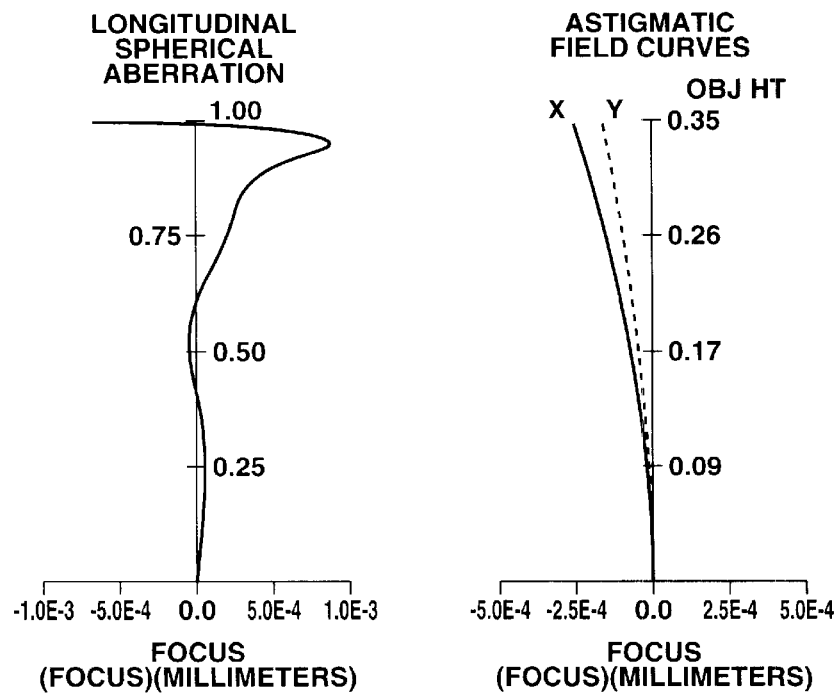
FIG. 9 shows graphs illustrating the spherical aberration and the astigmatism of light of the hologram of Example 2 of the present invention when the oscillation wavelength of the semiconductor laser is changed along with the refractive index of the medium by the change in the environmental temperature.

FIG. 9 shows graphs illustrating the spherical aberration and the astigmatism of light of the hologram of Example 2 when the oscillation wavelength of the semiconductor laser is changed by 8 nm along with the refractive index of the medium by the change in the environmental temperature. As shown in FIG. 9, when a semiconductor laser is used for the light source, the change in the spherical aberration caused by the change in the refractive index arising as a result of the change in the environmental temperature of the medium 4 between the first surface 1 and the second surface 2 is substantially offset by the change in the spherical aberration of the hologram 4 attributable to the change in the oscillation wavelength of the semiconductor laser of the light source caused by the change in the environmental temperature.

What is claimed is:

1. An objective lens having a numerical aperture greater than 0.5 and comprising a single objective lens adapted to a finite system, said objective lens having first and second aspherical surfaces;
   a hologram being formed on at least one of said aspherical surfaces;
   when using a semiconductor laser as light source, the change in the spherical aberration caused by the change in the refractive index arising as a result of the change in the environmental temperature of the medium between the first surface and the second surface being substantially offset by the change in the spherical aberration of the hologram attributable to the change in the oscillation wavelength of the semiconductor laser of the light source caused by the change in the environmental temperature.

2. The objective lens according to claim 1, wherein, if the radius of curvature of the first surface and that of the second surface are respectively r1 and r2 and the focal length is f, while the cone constants of the first and second surfaces are respectively k1 and k2 and the distance between the two surfaces is D, they satisfy the requirements of the formulas (1) through (5) listed below:
   (1) 0.65<r1/f<0.75
   (2) 1.2<r2/f<1.4
   (3) −0.85<k1<−0.7
   (4) 0.2<k2<0.8
   (5) 0.8<D/f<1.2.

3. The objective lens according to claim 1, wherein said objective lens is made of a plastic material.

4. The objective lens according to claim 1, wherein the light of the positive 1st order or that of the negative 1st order of the hologram is subjected to optimal correction of spherical aberration under actual operating conditions.

5. An optical pickup device comprising:
   a semiconductor laser operating as light source;
   an objective lens for converging the flux of light emitted from the semiconductor laser onto the signal recording surface of an optical recording medium;
   a photodetector for detecting the flux of light converged onto the signal recording surface by the objective lens and reflected from said signal recording surface;
   said objective lens having a numerical aperture greater than 0.5 and comprising a single objective lens adapted to a finite system, said objective lens having first and second aspherical surfaces;
   a hologram being formed on at least one of said aspherical surfaces; and
   when using a semiconductor laser as light source, the change in the spherical aberration caused by the change in the refractive index arising as a result of the change in the environmental temperature of the medium between the first surface and the second surface being substantially offset by the change in the spherical aberration of the hologram attributable to the change in the oscillation wavelength of the semiconductor laser of the light source caused by the change in the environmental temperature.

6. The optical pickup device according to claim 5, wherein,
   if the radius of curvature of the first surface and that of the second surface of the objective lens are respectively r1 and r2 and the focal length of the objective lens is f, while the cone constants of the first and second surfaces of the objective lens are respectively k1 and k2 and the distance between the two surfaces of the objective lens is D, they satisfy the requirements of the formulas (1) through (5) listed below:
(1) 0.65<r1/f<0.75
(2) 1.2<r2/f<1.4
(3) −0.85<k1<−0.7
(4) 0.2<k2<0.8
(5) 0.8<D/f<1.2.

7. The optical pickup device according to claim 5, wherein said objective lens is made of a plastic material.

8. The optical pickup device according to claim 5, wherein the light of the positive 1st order or that of the negative 1st order of the hologram is subjected to optimal correction of spherical aberration under actual operating conditions.

9. An optical disk device comprising:
a rotary drive mechanism for holding an optical disk and driving it to rotate; and
an optical pickup device for recording information signals on or reproducing information signals from the optical disk driven to rotate by said rotary drive mechanism;
said optical pickup device including:
a semiconductor laser operating as light source;
an objective lens for converging the flux of light emitted from the semiconductor laser onto the signal recording surface of an optical recording medium;
a photodetector for detecting the flux of light converged onto the signal recording surface by the objective lens and reflected from said signal recording surface;
said objective lens having a numerical aperture greater than 0.5 and comprising a single objective lens adapted to a finite system, said objective lens having first and second aspherical surfaces;
a hologram being formed on at least one of said aspherical surfaces, the light of the positive 1st order or that of the negative 1st order of the hologram being subjected to optimal correction of spherical aberration under actual operating conditions; and
when using a semiconductor laser as light source, the change in the spherical aberration caused by the change in the refractive index arising as a result of the change in the environmental temperature of the medium between the first surface and the second surface being substantially offset by the change in the spherical aberration of the hologram attributable to the change in the oscillation wavelength of the semiconductor laser of the light source caused by the change in the environmental temperature.

10. The optical disk device according to claim 9, wherein, if the radius of curvature of the first surface and that of the second surface of the objective lens are respectively r1 and r2 and the focal length of the objective lens is f, while the cone constants of the first and second surfaces of the objective lens are respectively k1 and k2 and the distance between the two surfaces of the objective lens is D, they satisfy the requirements of the formulas (1) through (5) listed below:
(1) 0.65<r1/f<0.75
(2) 1.2<r2/f<1.4
(3) −0.85<k1<−0.7
(4) 0.2<k2<0.8
(5) 0.8<D/f<1.2.

11. The optical disk device according to claim 9, wherein said objective lens is made of a plastic material.

12. The optical disk device according to claim 9, wherein the light of the positive 1st order or that of the negative 1st order of the hologram is subjected to optimal correction of spherical aberration under actual operating conditions.

13. An objective comprising a single objective lens adapted to a finite system and made of a plastic material,
said objective lens having:
first and second aspherical surfaces;
a hologram formed on at least one of said aspherical surfaces; and
the change in the spherical aberration of the hologram attributable to the change in the oscillation wavelength of the semiconductor laser of the light source caused by the change in the environmental temperature arising to reduce the change in the spherical aberration caused by the change in the refractive index arising as a result of the change in the environmental temperature of the medium between the first surface and the second surface.

14. The objective lens according to claim 13, wherein, if the radius of curvature of the first surface and that of the second surface are respectively r1 and r2 and the focal length is f, while the cone constants of the first and second surfaces are respectively k1 and k2 and the distance between the two surfaces is D, they satisfy the requirements of the formulas (1) through (5) listed below:
(1) 0.65<r1/f<0.75
(2) 1.2<r2/f<1.4
(3) −0.85<k1<−0.7
(4) 0.2<k2<0.8
(5) 0.8<D/f<1.2.

15. An objective lens according to claim 13, wherein the light of the positive 1st order or that of the negative 1st order of the hologram is subjected to optimal correction of spherical aberration under actual operating conditions.

16. The objective lens according to claim 13, wherein said objective lens has a numerical aperture greater than 0.5.

17. An optical pickup device comprising:
a semiconductor laser operating as light source;
an objective lens for converging the flux of light emitted from the semiconductor laser onto the signal recording surface of an optical recording medium; and
a photodetector for detecting the flux of light converged onto the signal recording surface bye objective lens and reflected from said signal recording surface;
said objective lens being a single objective lens adapted to a finite system and made of a plastic material,
said objective lens having:
first and second aspherical surfaces; and
a hologram formed on at least one of said aspherical surfaces;
the change in the spherical aberration of the hologram attributable to the change in the oscillation wavelength of the semiconductor laser of the light source caused by the change in the environmental temperature arising to reduce the change in the spherical aberration caused by the change in the refractive index arising as a result of the change in the environmental temperature of the medium between the first surface and the second surface.

18. The optical pickup device according to claim 17, wherein,
if the radius of curvature of the first surface and that of the second surface of the objective lens are respectively r1 and r2 and the focal length of the objective lens is f, while the cone constants of the first and second surfaces of the objective lens are respectively k1 and k2 and the distance between the two surfaces of the objective lens is D, they satisfy the requirements of the formulas (1) through (5) listed below:
(1) $0.65 < r1/f < 0.75$
(2) $1.2 < r2/f < 1.4$
(3) $-0.85 < k1 < -0.7$
(4) $0.2 < k2 < 0.8$
(5) $0.8 < D/f < 1.2$.

19. The optical pickup device according to claim 17, wherein the light of the positive 1st order or that of the negative 1st order of the hologram is subjected to optimal correction of spherical aberration under actual operating conditions.

20. The optical pickup device according to claim 17, wherein said objective lens has a numerical aperture greater than 0.5.

21. An optical disk device comprising:
   a rotary drive mechanism for holding an optical disk and driving it to rotate; and
   an optical pickup device for recording information signals on or reproducing information signals from the optical disk driven to rotate by said rotary drive mechanism;
   said optical pickup device including:
      a semiconductor laser operating as light source;
      an objective lens for converging the flux of light emitted from the semiconductor laser onto the signal recording surface of an optical recording medium; and
      a photodetector for detecting the flux of light converged onto the signal recording surface by the objective lens and reflected from said signal recording surface;
      said objective lens being a single objective lens adapted to a finite system and made of a plastic material,
      said objective lens having:
         first and second aspherical surfaces; and
         a hologram formed on at least one of said aspherical surfaces;
         the change in the spherical aberration of the hologram attributable to the change in the oscillation wavelength of the semiconductor laser of the light source caused by the change in the environmental temperature arising to reduce the change in the spherical aberration caused by the change in the refractive index arising as a result of the change in the environmental temperature of the medium between the first surface and the second surface.

22. The optical disk device according to claim 21, wherein,
   if the radius of curvature of the first surface and that of the second surface of the objective lens are respectively r1 and r2 and the focal length of the objective lens is f, while the cone constants of the first and second surfaces of the objective lens are respectively k1 and k2 and the distance between the two surfaces of the objective lens is D, they satisfy the requirements of the formulas (1) through (5) listed below:
   (1) $0.65 < r1\ f < 0.75$
   (2) $1.2 < r2\ f < 1.4$
   (3) $-0.85 < k1 < -0.7$
   (4) $0.2 < k2 < 0.8$
   (5) $0.8 < D/f < 1.2$.

23. The optical disk device according to claim 21, wherein the light of the positive 1st order or that of the negative 1st order of the hologram is subjected to optimal correction of spherical aberration under actual operating conditions.

24. The optical disk device according to claim 21, wherein said objective lens has a numerical aperture greater than 0.5.

* * * * *

UNITED STATES PATENT AND TRADEMARK OFFICE
CERTIFICATE OF CORRECTION

PATENT NO.   : 6,434,104 B2
DATED         : August 13, 2002
INVENTOR(S)  : Yoshito Asoma It is certified that error appears in the above-identified patent and that said Letters Patent is hereby corrected as shown below:

Column 10,
Line 5, replace "objective comprising" with -- objective lens comprising --.
Line 47, replace "bye" with -- by --.

Column 12,
Line 24, replace "(1) 0.65<rlf<0.75" with -- (1) 0.65<rl/f<0.75 --.
Line 25, replace "(2) 1.2<r2f<1.4" with -- (2) 1.2<r2/f<1.4 --.

Signed and Sealed this

Fifteenth Day of April, 2003

JAMES E. ROGAN
*Director of the United States Patent and Trademark Office*